United States Patent [19]

Snowden et al.

[11] Patent Number: 4,908,523
[45] Date of Patent: Mar. 13, 1990

[54] ELECTRONIC CIRCUIT WITH POWER DRAIN CONTROL

[75] Inventors: Gregory O. Snowden; Joan S. DeLuca; Gary L. Pace, all of Boca Raton, Fla.

[73] Assignee: Motorola, Inc., Schaumburg, Ill.

[21] Appl. No.: 176,960

[22] Filed: Apr. 4, 1988

[51] Int. Cl.$^4$ .......................... H02J 1/00; H02J 7/00; H02J 1/10

[52] U.S. Cl. ......................................... 307/43; 307/66; 307/18

[58] Field of Search ....................... 307/43, 66, 64, 29, 307/23, 18, 140, 139, 87; 363/41

[56] References Cited

U.S. PATENT DOCUMENTS

| | | |
|---|---|---|
| 3,696,286 | 10/1972 | Ule . |
| 4,143,282 | 3/1979 | Berard, Jr. et al. ..................... 307/43 |
| 4,345,286 | 8/1982 | Kanayama et al. ............... 307/18 X |
| 4,575,640 | 3/1986 | Martin ..................................... 307/23 |
| 4,599,686 | 7/1986 | Muller et al. .......................... 363/41 |
| 4,617,473 | 10/1986 | Bingham ............................... 307/66 |
| 4,692,145 | 9/1987 | Weyant ............................. 307/66 X |
| 4,698,578 | 10/1987 | Mullersman et al. ............ 307/66 X |
| 4,745,299 | 5/1988 | Eng et al. ............................... 307/66 |
| 4,774,450 | 9/1988 | Kitamura ......................... 307/66 X |
| 4,788,450 | 11/1988 | Wagner .............................. 307/66 X |

Primary Examiner—William M. Shoop, Jr.
Assistant Examiner—Sharon D. Logan
Attorney, Agent, or Firm—Vincent B. Ingrassia

[57] ABSTRACT

A power switching circuit is described for supplying power to a radio pager which must be continuously powered from either a main or backup battery. The main battery voltage is monitored and at appropriate levels as its value falls, selected functions of the pager are eliminated and switch over to the backup battery is made to keep alive essential functions.

19 Claims, 2 Drawing Sheets

ELECTRONIC CIRCUIT WITH POWER DRAIN CONTROL

FIELD OF THE INVENTION

This invention relates to power switching circuit arrangements for supplying power to an electronic circuit.

The invention is particularly, although not exclusively applicable, to a radio pager having a micro-computer which requires to be powered continuously from either a relatively high capacity main battery or from a relatively low capacity backup battery.

BACKGROUND

In known circuits, the back-up battery is commonly coupled to the power supply by way of simple isolation diodes or series transistor switches. Both of these switching techniques are relatively inefficient and also the use of isolation diodes is not possible at operating voltages significantly below 2V.

An object of the invention is to provide an improved power switching circuit.

A further object of the invention is to provide a power switching circuit for controlling the supply of power from either a primary or secondary battery, and which is capable of switching between primary and secondary batteries at voltages below 2V.

A still further object is to control battery discharge to provide extended operating life.

SUMMARY OF THE INVENTION

According to a first aspect of the invention there is provided a power switching circuit for selectively coupling an output terminal to a first or a second battery, the circuit comprising a first input terminal for connection to the first battery; a second input terminal for connection to the second battery; an output terminal; switching means responsive to the voltage of the first battery for selectively switching the output terminal from the first to second input terminal in response to the voltage of the first battery falling to a predetermined level.

The switching means may include a comparator coupled to compare the voltage at the first input terminal with a first reference voltage.

The comparator may conveniently be operative to compare the voltage of the first battery with each of a plurality of reference voltages.

Conveniently warning means provides a low battery warning in response to the voltage of the first battery having fallen to the level of a predetermined one of the plurality of reference voltages.

In one embodiment of the invention a second output terminal is provided coupled to the first input terminal through second switching means controllable by the first switching means, to isolate the second output terminal from the first battery in response to the voltage of the first battery having fallen to the level of a further predetermined one of the plurality of reference voltages.

A first circuit portion which is preferably a microprocessor may be coupled to the output terminal of the switching circuit.

The microprocessor may be operative to provide timekeeping functions and may be coupled to a time of day display.

The microprocessor may be coupled to the first switching means for receiving an indication of selection of the second input terminal, storage means being coupled to the microprocessor for storing an indication of the duration of connection to the second input terminal.

The microprocessor may be operative to inhibit power consumption when the said duration exceeds a predetermined duration.

A second circuit portion typically including relatively high power radio paging circuits may be coupled to the second output terminal.

The switching means preferably includes a switched voltage regulator having respective inputs coupled to the said first and second input terminals and an output coupled to the said output terminal, means being provided for supplying switching signals to the regulator.

A battery compartment may be provided for the first battery, the compartment having access means to enable removal of the battery; sensing means being provided for sensing the opening of the access means, the switching means being responsive to an output signal provided in the sensing means to isolate the second circuit portion from the first battery.

According to a second aspect of the invention there is provided a radio pager and time piece having a relatively high power portion and a relatively low power timekeeping portion and a time of day display driven by the timekeeping portion; a power switching circuit having a first input terminal for connection to a first battery; a second input terminal for connection to a second battery; an output terminal coupled to the timekeeping portion; switching means responsive to the voltage of the first battery for selectively switching the output terminal from the first to the second input terminal; in response to the voltage of the first battery falling to a predetermined level.

According to a third aspect of the invention there is provided an electronic circuit having a plurality of operating functions and including a power supply terminal connectible to a battery for supplying power to the electronic circuit and means responsive to the battery voltage at the power supply terminal for selecting predetermined ones of said operating functions in dependence upon the battery voltage level.

According to a fourth aspect of the invention there is provided a power switching circuit for selectively coupling an output terminal to a first or a second battery, the circuit comprising a first input terminal for connection to the first battery; a second input terminal for connection to the second battery; an output terminal; switching means for selectively coupling the output terminal to the first or second input terminal; a battery compartment for housing at least the first battery, the compartment having access means to enable removal of the first battery;

sensing means for sensing the opening of the access means and means responsive to an output signal provided by the sensing means for controlling the switching means to select coupling of the output terminal to the second input terminal.

According to a fifth aspect of the invention there is provided a voltage switching circuit for selectively providing an output voltage derived from at least one of a plurality of voltage sources, the circuit comprising; a plurality of input terminals for coupling to respective voltage sources; an output terminal; capacitive means coupled between the output terminal and a ground reference terminal; a plurality of transistors each having a first electrode coupled to a respective one of the input terminals and to the output terminal, a second electrode coupled to the ground reference terminal and a control electrode; pulse width modulator means coupled to the output terminal and switching means for selectively coupling the pulse width modulator means to the control electrode of at least one selected transistor in dependence upon the desired voltage source.

According to a sixth aspect of the invention there is provided an electronic circuit connectible to a battery and comprising a microprocessor operable under program control at a plurality of bus frequencies the bus frequency being selected in dependence upon the battery voltage level.

BRIEF DESCRIPTION OF THE DRAWINGS

An exemplary embodiment of the invention will now be described with reference to the drawings in which.

DETAILED DESCRIPTION OF THE DRAWINGS

Figure 1:
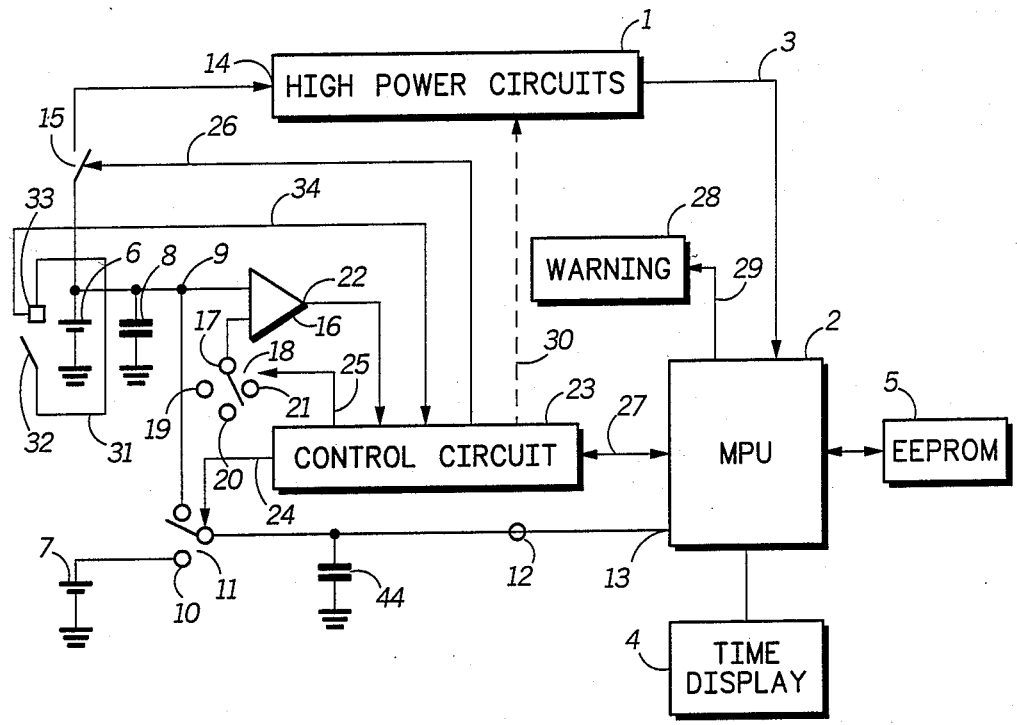
FIG. 1 illustrates schematically an embodiment of a radio pager including the power switching circuit of the invention.

Referring now to FIG. 1, a first circuit portion 1 containing the relatively high power parts of a radio pager 1 and a low power portion for page decoding and timekeeping, typically in the form of a microprocessor 2. The microprocessor 2 is coupled to the high power portion 1 by a bus 3. The microprocessor 2 provides a time signal output to a time of day display 4 and is also coupled to a non-volatile memory 5 which is typically an EEPROM memory.

Power for the high current circuits 1 and the microprocessor 2 is supplied from either a main battery 6 or a backup battery 7.

The main battery 6 is coupled to a first input terminal 9. A smoothing capacitor 8 is coupled between the terminal 9 and ground. Similarly a second input terminal 10 is connected to the secondary battery 7.

The second input terminal 10 forms one input terminal of a first switch 11, a second input of which is connected to the first input terminal 9. The switch 11 has its output connected to a first output terminal 12 which is coupled to a power input terminal 13 of the microprocessor 2.

A power input terminal 14 of the portion 1 is coupled via a second switch 15 to the terminal 9 and consequently to the main battery 6.

The first input terminal 9 is also coupled to one input of a comparator 16, a second input of which is coupled to the output terminal 17 of a cyclically scanning switch 18 having three input terminals 19, 20 and 21 for respectively receiving reference voltages $V_1$, $V_2$ and $V_3$ of which $V_1$ is the largest, $V_2$ the next largest and $V_3$ the smallest.

The comparator 16 has an output bus 22 coupled to a control circuit 23 which has output buses 24, 25, 26, and a two way bus connection 27 to the microprocessor 2. The two way bus 27 enables the microprocessor to exert overall control of the control circuit 23 based upon programmed battery threshold information. The output bus 24 is coupled to the control circuit 23 to control the switching of the first switch 11 between the two input terminals 9 and 10 whilst the bus 25 controls the cyclic switching of the switch 18. The output bus 26 is connected to control the opening and closing of the second switch 15. An additional output bus 30 (shown dashed) is coupled to the high current circuits 1. A warning alarm 28 which may be a visual, audible or any other sensible alarm is coupled to the microprocessor 2 via a bus 29.

The main battery 6 is conveniently located in a compartment 31 having a door or other suitable closure 32. A door opening sensor 33, which may be an optical sensor or a simple switch sensor, is coupled to the control circuit 23 by means of a bus 34.

The circuit portion 1 requires a relatively high level of power to operate and needs to be driven by the main battery. The backup battery 7 has a relatively small capacity and is unable to drive the high current portion 1 in normal operation. On the other hand the microprocessor 2 requires only a relatively low power battery and whilst preferably powered by the main battery 6, may also be powered by the backup battery 7. In addition, in view of its timekeeping function the microprocessor 2 must have some of its functions powered continuously even when the main battery has fallen to a level which is too low adequately to power the high power portion 1 and also when the main battery is removed for replacement.

The control circuit, via the bus 25 and the switch 18, couples each of the reference voltages 19, 20 and 21, in turn to the reference voltage input terminal 17 of the comparator 6, which compares each reference voltage with that of the main battery 6.

If the voltage of the main battery is above $V_1$, normal operation continues and the portion 1 and the microprocessor 2 remain powered by the main battery 6. When the voltage of the main battery has fallen to the level of the reference voltage $V_1$ the comparator 16 provides an output signal at its output 22 which is fed to the control circuit 23. The control circuit provides over the bus 27 a signal to the microprocessor 2, which in turn provides an output signal on the bus 29, to activate the alarm 28 to provide a warning that the voltage of the main battery is becoming low. Both the high power portion 1 and the microprocessor 2 remain powered by the battery 6.

When the voltage of the main battery has fallen to the level of the reference voltage $V_2$, the comparator provides another output signal, which is fed to the control circuit 23 which in response provides a signal on the bus 27 to open the switch 15 to isolate the portion 1 from the main battery. The higher power paging circuits are thus turned off. The microprocessor 2 remains coupled to the main battery 6, which still retains adequate capacity to drive the essential timekeeping functions of the microprocessor 2.

Some microprocessor functions may also be eliminated as the main battery voltage falls to prolong the useful life of the main battery and postpone switching to the backing battery.

The microprocessor 2, may, under program control, change its operating frequency in response to changing battery voltage. In particular as the battery voltage falls the microprocessor may switch to a lower bus frequency to reduce its power consumption.

If the voltage of the main battery falls further to the value of the reference voltage $V_3$, an output signal is fed from the comparator 16 to the control circuit 23, which now provides a signal on the bus 24, to change over the switch 11 to the second input terminal 10. The microprocessor now becomes powered by the backup battery 7 to maintain its essential functions and may also operate at reduced frequency as described above to further reduce power consumption.

Since the capacity of the backup battery 7 is typically small, it may be necessary to limit the duration of its use to power the microprocessor. In the embodiment of FIG. 1, this is done by the microprocessor 2 measuring the time during which it is coupled to the secondary battery.

The control circuit 23 provides an output signal to the microprocessor 2 over the bus 28 each time that the control circuit 23 effects a change over to the backup battery. This output signal to the microprocessor 2 is used by the microprocessor to initiate a measurement of the time duration by starting a timer of predetermined length.

When the timer has run down the microprocessor shuts down to prevent further power drain from the backup battery. The elapsed time spent draining power from the backup battery may be stored in the EEPROM 5. The elapsed time may be displayed to indicate the remaining usable life of the backup battery. In order to achieve a sufficiently low current state to prolong the life of the backup battery some microprocessor functions may be eliminated whilst powered by the backup battery leaving only the essential timekeeping function.

As an alternative to eliminating all high power functions by means of the switch 15 it is also possible via the additional bus 30 (shown dashed) to eliminate progressively the high current paging functions as the main battery voltage falls. The voltage of the main battery 6 can be compared with any number of reference voltages to provide signals to the control circuit 23 to effect function reduction.

In the event of sudden removal of the primary battery 6 whilst high current is drawn by the portion 1, the voltage of the main battery 6 may decay so rapidly that the switch over may not be fast enough to prevent a power loss to the microprocessor 2. To mitigate this problem sensor 33 senses the opening of the door 32 of the battery compartment 31. On sensing the opening of the door, the sensor provides an output signal to the control circuit 23 over the bus 34. The control circuit opens the switch 15 to isolate the high current circuitry 1 and reduce the current drain.

As an alternative to disconnecting the high current circuits 1 the sensor signal provided on opening the door 32 may be used to effect a change over of the switch 11, to connect the microprocessor 2 to the backup battery, thereby preserving its essential timekeeping functions.

Figure 2:
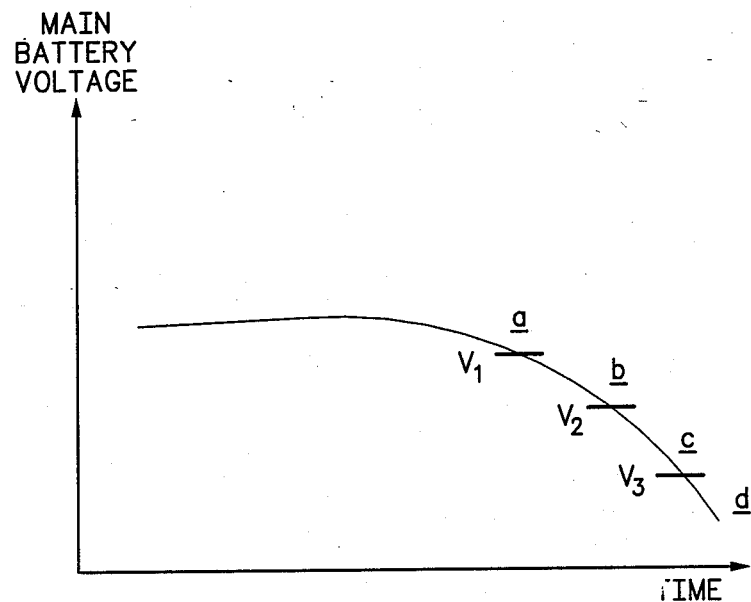
FIG. 2 is a graph illustrating the decay of battery voltage with time.

Referring to FIG. 2, there is shown a graph of the decay of the main battery voltage with time. In the region a when the voltage is above $V_1$ normal operation continues with both the high current circuits 1 and the microprocessor 2 coupled to the main battery.

On reaching $V_1$ the low battery warning is given but in region b normal operation continues as in region a.

On reaching $V_2$ the high power circuits are turned off so that in region c only the microprocessor continues to operate powered by the main battery.

In the region d below the voltage $V_3$ the backup battery becomes the power source for the microprocessor 2.

Figure 3:
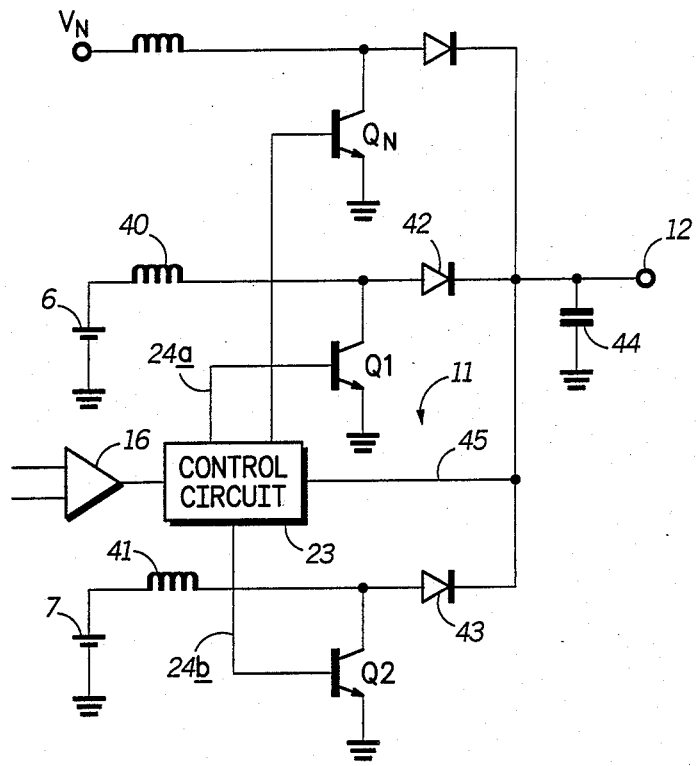
FIG. 3 illustrates schematically a voltage switching circuit for use in the circuit of FIG. 1.

Referring to FIG. 3 there is shown a voltage switching circuit suitable for use as the switch 11 for changing over from main to the backup battery.

The switching circuit comprises a switching voltage regulator in which each battery provides a separate input to the regulator. The main battery 6 is coupled via an inductor 40 to the collector of a transistor Q1. Similarly the backup battery 7 is coupled via inductor 41 to the collector of a transistor Q2.

The collectors of the two transistors Q1 and Q2 are coupled via diodes 42 and 43 respectively to the output terminal 12. A capacitor 44 is coupled between the output terminal 12 and ground potential and develops the output voltage which is fed back over line 45 to the control circuit.

The emitters of Q1 and Q2 are connected to ground. The bus 24 which carries the control signals from the control circuit 23 to switch the switch 11 comprises lines 24a and 24b connected between the control circuit 23 and the bases of Q1 and Q2 respectively.

In operation, the control circuit 23 includes a pulse width modulator which feeds a pulse width modulated signal to the base of one or other of the transistors Q1 and Q2 depending upon whether the main battery 6 or the backup battery 7 is to be coupled to the output terminal 12. An output voltage is then developed on the capacitor 44. The output voltage is fed back over line 45 and is used by the pulse width modulator to adjust the pulse width to give fine control of the output voltage.

In response to an output signal from the comparator 16, the control circuit 23 switches the pulse width modulated drive signal to the base of the transistor Q2 to switch from the main to the backup battery 7. The above described switching circuit is an improvement over the known technique of using transistors and/or diodes in series with the input voltages. The new switching circuit has the advantage of being capable of providing at the output a voltage equal to the input voltage selected. The voltage drop in the prior art series switching element (transistor or diode) is eliminated. Additionally, the switching circuit will operate at a lower input voltage than in the case where series diodes are used.

The switching circuit is also capable of providing an output voltage which is larger than the selected input voltage. For applications where this is desired the switching circuit has advantages over the known technique of using series transistors or diodes to switch input voltages to the input indicator of a voltage step-up circuit. The circuit will operate at lower input voltages and will also provide more efficient power transfer to the output by eliminating losses in the series switching elements. The switching circuit is especially applicable to a radio paging device which typically is powered from nominally 1.5V batteries and which incorporates a microcomputer which requires a supply voltage of about 3 volts.

The described switching circuit may be used in other applications in which a selectable one of a plurality N of voltages (which may be the same as one another) is regulated and switched by a respective transistor coupled in similar manner to the transistors $Q_1$ and $Q_2$. This is indicated in FIG. 3 for the generalised case of voltage $V_N$ and regulating transistor $Q_N$. The control circuit applies a pulse width modulated signal to the base of the transistor $Q_N$ whose voltage $V_N$ is to be regulated and fed to the output terminal 12.

It is also possible for the pulse width modulated control signals to be applied to more than one of the transistor bases simultaneously. By so doing portions of the output power can be supplied by more than one input source. This provides an advantage over known switching techniques in that the power input source can gradually be changed from one voltage source to another. This results in there being no discontinuity in the output voltage during the switchover.

There is also an improvement in the isolation of the input sources from one another. There is no possibility of significant current flow from one input voltage source into another (unless the reverse breakdown voltage of the diodes is exceeded). Using the known art of switching with series transistors, coupling between input sources can occur when more than one transistor switch is closed simultaneously in order to avoid an output voltage discontinuity during switchover. This coupling is undesirable, since it may result in the momentary charging of a non-rechargeable battery or in the loss of battery capacity.

Figure 4:
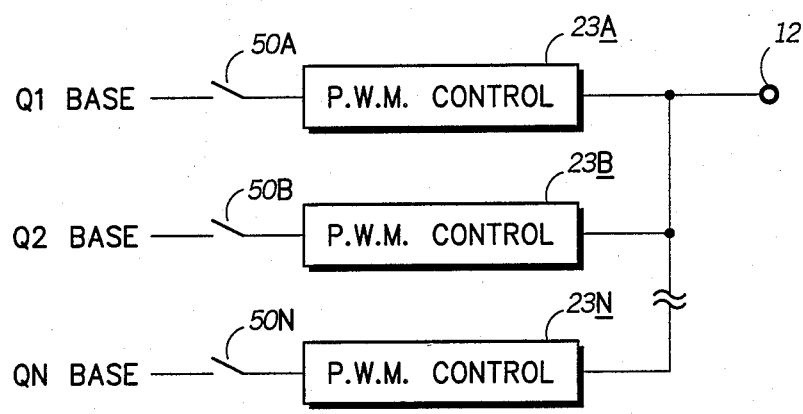
FIG. 4 illustrates an alternative embodiment of voltage switching circuit.

Referring now to FIG. 4 there is illustrated an alternative embodiment of a voltage switching circuit. The pulse width modulator control circuit 23 is replaced by a plurality of pulse width modulator means 23A, 23B, ... 23N which are all coupled to the output terminal 12 and via respective switch means 50A, 50B, ... 50N to bases of respective transistors Q1 to QN so that any one or more of a plurality of voltage sources V1 to VN may be regulated and switched to the output terminal to supply appropriate portions of the output power.

The invention has been described by way of example and modification may be made without departing from the scope of the invention, which is defined solely by the appended claims.

In particular although the power switching circuit of the invention has been described with particular reference to its application in a combined time piece and pager it may be used in any application where there is a requirement for the uninterrupted supply of power to some circuit portion or the progressive elimination of circuit functions in response to reducing battery voltage. The voltage switching circuits of FIG. 3 and 4, although illustrated utilising bipolar transistors may equally well use field effect transistors.

We claim:

1. A power switching circuit for selectively coupling an output terminal to a first or a second battery, the circuit comprising: a first input terminal for connection to the first battery; a second input terminal for connection to the second battery; an output terminal; first switching means responsive to the voltage of the first battery for selectively switching the output terminal from the first to the second input terminal in response to the voltage of the first battery falling to a first predetermined level, said first switching means including a comparator coupled to compare the voltage of a primary one of said first or second batteries at the first input terminal with a first reference voltage; second switching means controllable by said first switching means; a second output terminal coupled to the first input terminal through said second switching means, said second switching means for isolating the second output terminal from the first battery in response to the voltage of the first battery falling to a second predetermined level.

2. The circuit of claim 1 wherein the comparator is operative to compare the voltage of the first battery with each of a plurality of reference voltages.

3. The circuit of claim 2 including warning means for providing a low battery warning in response to the voltage of the first battery having a fallen to the level of a predetermined one of the plurality of reference voltages.

4. The circuit of claim 2 wherein said second predetermined level is a further predetermined one of the plurality of reference voltages.

5. The circuit of claim 1 and further including a first circuit portion coupled to the output terminal of the switching circuit.

6. The circuit of claim 5 wherein the first circuit portion includes a microprocessor.

7. The circuit of claim 6 wherein the microprocessor provides timekeeping functions.

8. The circuit of claim 7 and further including a time of day display coupled to the microprocessor.

9. The circuit of claim 6 wherein the microprocessor is coupled to the first switching means for receiving an indication of the selection of the second input terminal, storage means being coupled to the microprocessor for storing an indication of the duration of connection to the second input terminal.

10. The circuit of claim 9 wherein the microprocessor is operative to inhibit power consumption when the said duration exceeds a predetermined duration.

11. The circuit of claim 1 and further including a second circuit portion coupled to the second output terminal.

12. The circuit of claim 11 wherein the second circuit portion includes relatively high power radio paging circuits.

13. The circuit of claim 1 wherein the switching means includes a switched voltage regulator having respective inputs coupled to the said first and second input terminals and the output coupled to the said output terminal, means being provided for supplying switching signals to the regulator.

14. The circuit of claim 11 and further comprising a battery compartment for the first battery, the compartment having access means to enable removal of the battery; sensing means for sensing the opening of the access means, the switching means being responsive to an output signal provided by the sensing means to isolate the second circuit portion from the first battery.

15. An electronic circuit having a plurality of operating functions and including a power supply terminal connectible to a battery for supplying power to the electronic circuit and means responsive to the battery voltage at the power supply terminal for selecting predetermined ones of said operating functions in dependence upon the battery voltage level, said circuit including a microprocessor operable, under program control, at a plurality of bus frequencies, the bus frequency being selected in dependence upon the battery voltage level.

16. The circuit of claim 15 wherein the operating functions include predetermined radio paging functions.

17. The circuit of claim 15 wherein the operating functions include timekeeping functions.

18. The circuit of claim 15 and including a second power supply terminal for connection to a second battery, the means responsive to said battery voltage being operative to switch predetermined portions of the circuit from the said power supply terminal to the second power supply terminal in response to the voltage of said battery falling to a predetermined level.

19. The circuit of claim 15 wherein the bus frequency is reduced in response to falling battery voltage level to reduce power consumption of the microprocessor.

* * * * *